(12) United States Patent
Thampy et al.

(10) Patent No.: US 7,542,995 B2
(45) Date of Patent: Jun. 2, 2009

(54) METHOD AND APPARATUS FOR DETECTING A CHANGE-POINT IN A TIME-SERIES OF COMPUTER TELEMETRY SIGNALS

(75) Inventors: Sajjit Thampy, La Jolla, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 617 days.

(21) Appl. No.: 11/403,127

(22) Filed: Apr. 11, 2006

(65) Prior Publication Data

US 2007/0239740 A1 Oct. 11, 2007

(51) Int. Cl.
*G06F 17/30* (2006.01)
*G06F 7/00* (2006.01)

(52) U.S. Cl. ............... 707/104.1; 707/101; 707/102
(58) Field of Classification Search ............. 707/104.1, 707/101, 102
See application file for complete search history.

(56) References Cited

U.S. PATENT DOCUMENTS

| | | | | |
|---|---|---|---|---|
| 5,303,203 A | * | 4/1994 | Kingman | 367/75 |
| 6,599,250 B2 | * | 7/2003 | Webb et al. | 600/483 |
| 7,084,859 B1 | * | 8/2006 | Pryor | 345/173 |
| 7,243,265 B1 | * | 7/2007 | Wookey et al. | 714/37 |
| 2004/0130442 A1 | * | 7/2004 | Breed et al. | 340/443 |
| 2005/0192727 A1 | * | 9/2005 | Shostak et al. | 701/37 |
| 2007/0220343 A1 | * | 9/2007 | Harres | 714/36 |

* cited by examiner

*Primary Examiner*—Kuen S Lu
(74) *Attorney, Agent, or Firm*—Park, Vaughan & Fleming LLP

(57) ABSTRACT

A system that detects a change point in a time series of telemetry signals from a computer system. During operation, the system receives the time series of telemetry signals from the computer system. For each element in the time series, the system (1) inserts the element into a data structure which keeps track of the number of elements in the data structure that have a value greater than and that have a value less than the value of the inserted element; and (2) uses the information stored in the data structure to add a contribution by the inserted element to a trend statistic for the time series. The system then uses the trend statistic to select a hypothesis for the trend in the time series.

23 Claims, 4 Drawing Sheets

```
Input: array[1..N]
AVL_TREE ← ∅
DUP_SET ← ∅
S ← 0
For i: N → 1
    X ← array[i];
    DUP_SET ← Remove_Duplicates(AVL_TREE, X);
    Insert(AVL_TREE, X);
    Compute_Left_Right(AVL_TREE,X, n_R , n_L );
    S ← S + n_R - n_L ;
    Insert_Duplicates(AVL_TREE,DUP_SET);
Next i;
Return S;
```

FIG. 3

METHOD AND APPARATUS FOR DETECTING A CHANGE-POINT IN A TIME-SERIES OF COMPUTER TELEMETRY SIGNALS

BACKGROUND

1. Field of the Invention

The present invention relates generally to techniques for detecting faults in computer systems. More specifically, the present invention relates to a method and apparatus for detecting a change-point in a time-series of telemetry signals from a computer system.

2. Related Art

Continuous system telemetry is increasingly being used to monitor the health of computer servers. Some telemetry signals have statistical properties that are dynamic with time (i.e., non-stationary processes). These telemetry signals can vary with changing system parameters such as CPU loads, memory demand, and I/O bandwidth. Other telemetry signals have statistical properties that are stationary with time (i.e., stationary noisy processes). One example of a stationary noisy process is voltage signals from DC-DC power supplies within a server.

When monitoring stationary noisy processes, one objective is to detect "change-points" in the noisy process. For example, in a noisy process with "flat" statistical properties, a change-point occurs when the level of the flat process changes. In a noisy process with a constant slope (either positive or negative), a change-point occurs when the magnitude of the slope changes.

A common technique for detecting a change-point is to set high and low threshold limits for the signal. For example, when monitoring voltage signals that are stationary noisy processes, typical values of the threshold limit are set to +/−5% of the nominal mean for the voltage signal. The problem with using threshold limits is that if the thresholds are set too closely, false alarms from spurious data values can occur. To avoid the false alarms, the thresholds are set further apart. Unfortunately, setting the thresholds further apart makes it more difficult to detect the onset of degradation in the system components (such as power supplies, voltage regulators, sensors, etc.) because the degradation will be more severe before an alarm is triggered.

Hence, what is needed is a method and an apparatus for detecting a change-point in a time-series without the problems described above.

SUMMARY

One embodiment of the present invention provides a system that detects a change point in a time-series of telemetry signals from a computer system. During operation, the system receives the time-series of telemetry signals from the computer system. For each element in the time-series, the system (1) inserts the element into a data structure which keeps track of the number of elements in the data structure that have a value greater than and that have a value less than the value of the inserted element; and (2) uses the information stored in the data structure to add a contribution by the inserted element to a trend statistic for the time-series. The system then uses the trend statistic to select a hypothesis for the trend in the time-series.

In a variation on this embodiment, the telemetry signals can include hardware variables and/or software variables.

In a further variation, the software variables include load metrics, CPU utilization, idle time, memory utilization, disk activity, transaction latencies, and other performance metrics reported by the operating system.

In a further variation, the hardware variables include temperature and voltage.

In a variation on this embodiment, the system computes a confidence factor based on the trend statistic and the number of elements in the time-series. If this confidence factor is below a specified confidence level, the system rejects the hypothesis. Otherwise, the system accepts the hypothesis.

In a variation on this embodiment, the data structure is a substantially balanced binary search tree. While inserting the element into the data structure, the system: (1) determines the value of the element; (2) traverses the substantially balanced binary search tree until a leaf node is reached, wherein at each node of the substantially balanced binary search tree, the value of the element being inserted is compared to the value of the element stored at the node to determine which sub-tree of the node to follow; (3) creates a new node at the leaf node; (4) inserts the element at the new node; and (5) for each node, the system (a) updates a variable at the node which indicates the number of elements in the substantially balanced binary search tree that have a value less than the value of the element stored at the node; and (b) updates a variable at the node which indicates the number of elements in the substantially balanced binary search tree that have a value greater than the value of the element stored at the node.

In a further variation, while traversing the substantially balanced binary search tree until a leaf node is reached, if the value of the element being inserted is less than the value of the element stored at the node, the system selects the sub-tree which corresponds to values less than the value stored at the node. If the value of the element being inserted is greater than the value of the element stored at the node, the system selects the sub-tree which corresponds to values greater than the value stored at the node.

In a further variation, the substantially balanced binary search tree is an AVL-tree, and for each node of the AVL-tree, the heights of the left sub-tree and the right sub-tree differ by at most one.

In a variation on this embodiment, while using the information stored in the data structure to add the contribution by the inserted element to the trend statistic for the time-series, the system computes the contribution by the inserted element to the trend statistic by taking the difference between the number of elements in the data structure that have a value greater than the value of the inserted element and the number of elements in the data structure than have a value less than the value of the inserted element. Next, the system adds the contribution by the inserted element to the trend statistic for the time-series.

In a variation on this embodiment, while using the trend statistic to select a hypothesis for the trend in the time-series the system determines if the trend statistic for the time-series indicates that the trend in the time-series is increasing. If so, the system selects an increasing trend hypothesis. Otherwise, the system determines if the trend statistic for the time-series indicates that the trend in the time-series is decreasing. If so, the system selects a decreasing trend hypothesis. Otherwise, the system selects the null hypothesis.

In a variation on this embodiment, prior to inserting elements into the data structure, the system removes duplicate values from the time-series.

In a further variation, after using the information stored in the data structure to add the contribution by the inserted element to a trend statistic for the time-series, the system inserts duplicate values back into the data structure.

In a variation on this embodiment, elements in the time-series are inserted into the data structure in reverse chronological order.

BRIEF DESCRIPTION OF THE FIGURES

FIG. 3 presents pseudo-code for detecting a change-point in accordance with an embodiment of the present invention.

Figure 1:
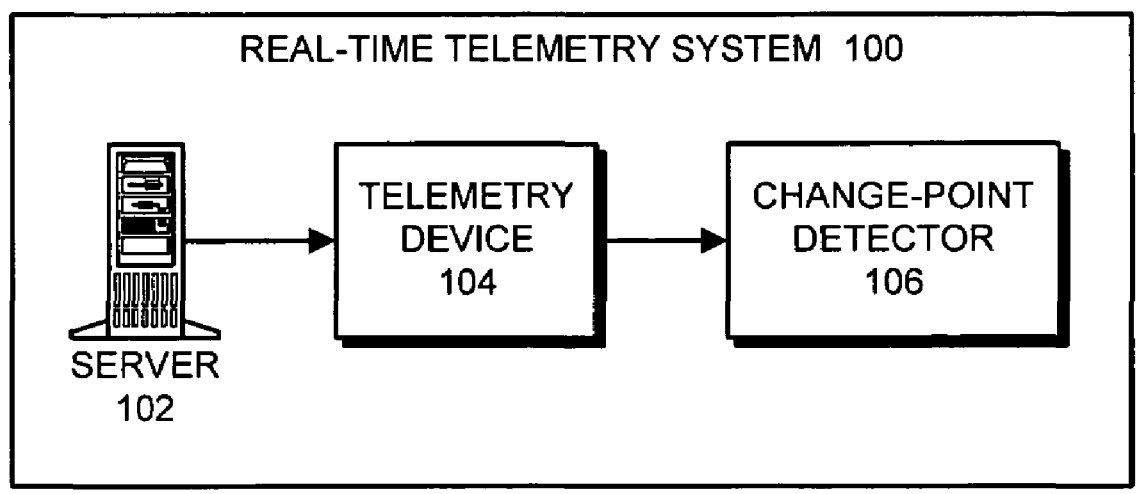
FIG. 1 illustrates a real-time telemetry system in accordance with an embodiment of the present invention.

Table 1 presents an exemplary listing of confidence factors based on the MK statistic and the total number of elements in the time-series.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

The Mann-Kendall (MK) test, which monitors a sequence of observations and detects if there is a "change-point" in the distribution from which the observations are drawn, can be used to detect a change-point in a stationary noisy process. The MK test also provides a quantitative confidence factor which can be used to make a decision as to whether or not a change-point has occurred in the distribution of the observations.

The MK test statistic is defined as:

$$S = \sum_{i=2}^{n}\sum_{j=1}^{i-1} sgn(X_i - X_j)$$

$$sgn(y) = \begin{cases} -1, & y < 0 \\ 0, & y = 0 \\ 1, & y > 0 \end{cases}$$

A confidence factor can be generated based on the MK test statistic S and the number of observations n. Table 1 presents an exemplary listing of confidence factors based on the MK statistic and the total number of elements in the time series. For example, if S=4 and n=5, the confidence factor is 0.242 (or 24.2%). Note that the confidence factor indicates the probability of a false-alarm. In this example, S indicates the probability that the time-series is increasing (i.e. positive S). Hence the confidence factor indicates that there is a 24.5% chance of incorrectly rejecting the null hypothesis $H_0$ (i.e. no change-point). In other words, there is a 75.5% chance that there is a positive change-point in the time-series.

TABLE 1

MK probabilities

| |S| | n 4 | 5 |
|---|---|---|
| 0 | 0.625 | 0.592 |
| 2 | 0.375 | 0.408 |
| 4 | 0.167 | 0.242 |
| 6 | 0.042 | 0.117 |
| 8 |  | 0.042 |
| 10 |  | 0.0083 |

The MK test was designed before computers existed and was used to detect change-points in small populations of observations (e.g. manually tracking the future-rate of devices under test and determining if the failure-rate is increasing or decreasing). For telemetry applications, the observations are sequences of digitized signals generated by sensors within a server. Since the computational cost of the MK test grows quadratically with the number of observations, the MK test is unsuitable for detecting change-points in a long time-series of digitized telemetry signals for stationary noisy processes. For large N, the average-case, best-case, and worst-case complexity of the MK test is $O(N^2)$.

The present invention presents a technique for performing a "Fast MK" test which substantially decreases the computational cost of determining if a change-point has occurred in a time-series of telemetry signals. The computational cost of the MK statistic computed using the present invention is $O(N \log N)$ in the typical-case and $O(N^2)$ in the worse-case.

One embodiment of the present invention provides a technique for detecting "change-points" in telemetry signals that are stationary noisy processes. In this embodiment, a quantitative confidence factor is provided which can be used to sound alarms. For example, an alarm can be activated only when there is a 99% confidence that there is a change-point in the underlying distribution of telemetry observations. The present invention breaks the "see-saw" effect of conventional threshold limit tests between sensitivity (close thresholds) and missed-alarms (wide thresholds).

Real-Time Telemetry System

FIG. 1 illustrates real-time telemetry system 100 in accordance with an embodiment of the present invention. Real-time telemetry system 100 contains server 102, which can generally include any computational node including a mechanism for servicing requests from a client for computational and/or data storage resources. In the present embodiment, server 102 is a high-end uniprocessor or multiprocessor server that is being monitored by real-time telemetry system 100.

Real-time telemetry system 100 also contains telemetry device 104 and change-point detector 106. Telemetry device 104 gathers information from the various sensors and monitoring tools within server 102, and directs the signals to a local or to a remote location that contains change-point detector 106.

Note that the telemetry signals gathered by telemetry device 104 can include hardware variables and/or software variables. The software variables include load metrics, CPU utilization, idle time, memory utilization, disk activity, transaction latencies, and other performance metrics reported by the operating system. The hardware variables include temperature, voltage, current, fan speeds, accelerometer signals, acoustic signals, relative humidity, and signals from other physical transducers.

Computing the Mann-Kendall Statistic

One embodiment of the present invention computes the MK statistic S in N log (N) time. Consider the contribution to S of any element $x_i$ in a sequence of observations. For all j>i (i.e. observations that occur later in time), all values of $x_j$ greater than the value of $x_i$ contribute a 1 to S, and all values of $x_j$ less than $x_i$ contribute a −1 to S. If all observations that occur earlier in time than $x_i$ are placed in a sorted array, and if $x_i$ is inserted into the sorted array in the appropriate ordered slot k, the number of elements in the sorted array to the right of slot k, $n_R$, is the number of +1 contributors and the number of elements to the left of k, $n_L$, is the number of −1 contributors. Hence, the contribution of element $x_i$ to the MK statistic is $n_R - n_L$.

Put in a more formal way, the order statistic of an element $x_k$ gives an indicator as to where $x_k$ would appear in a sorted array. Note that the $k^{th}$ order statistic of a set of N elements is the $k^{th}$ smallest element. Alternatively, if the order statistic of an element x is k, then the element x is in the $k^{th}$ position in a sorted order.

In one embodiment of the present invention, duplicate values are deleted prior to insertion into the sorted array. In this embodiment, the duplicate values are saved in a stack, and inserted back into the sorted array after computing the required order statistic.

For real-time applications, it is expensive to sort all values ahead of any value $x_i$, hence, in one embodiment of the present invention a balanced binary search tree is used to order the values in the time-series. In one embodiment of the present invention, the binary search tree is an AVL-tree that is integrated with the MK test.

Adelson-Velskii and Landis (AVL) Tree

In one embodiment of the present invention, an AVL-Tree (Adelson-Velskii and Landis) data structure is used to order the time-series. An AVL-tree is a balanced binary search tree where for each node of the tree, the height of the two sub-trees of the node differs by at most one. The computational complexity of look-up, insertion, and deletion are O(log N) where N is the total number of nodes. In one embodiment of the present invention, each node of the AVL-tree maintains the number of elements in its right sub-tree, left sub-tree, plus one to account for the node itself.

One embodiment of the present invention inserts elements of the time-series into the AVL-tree starting with the last element of the time-series (i.e. $X_n^{th}$ element) to the first element in the times series (i.e. $x_1$). In other words, the present invention inserts elements of the times-series in reverse chronological order. By using the AVL-tree data structure, the computational cost of inserting or deleting an element from the AVL-tree is log(N) time. Furthermore, the computational cost for updating the number of nodes in the left sub-tree and right sub-tree, which is used to compute the order statistic, is O(1).

FIGS. 1A-1M illustrate the process of constructing an AVL-tree in accordance with an embodiment of the present invention. An exemplary time-series of x=[1, 5, 7, 2, 4, 18, 9, 3] is used in FIGS. 1A-1M.

Figure 2A:
FIG. 2A illustrates inserting an element of a time-series into an empty AVL-tree in accordance with an embodiment of the present invention.

FIG. 2A illustrates inserting an element of a time-series into an empty AVL-tree in accordance with an embodiment of the present invention. In one embodiment of the present invention, the system inserts the last element in the time-series first. In the example time-series, the last element is a 3. Note that after inserting a node into the AVL-tree, the number of elements in the left and right sub-trees of each node is updated. Also note that since node 3 has no sub-trees, the number of elements in the left and right sub-trees of node 3 is zero.

Figure 2B:
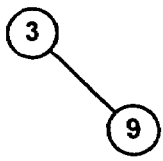
FIG. 2B illustrates inserting another element of the time-series into the AVL-tree in accordance with an embodiment of the present invention.

FIG. 2B illustrates inserting another element of the time-series into the AVL-tree in accordance with an embodiment of the present invention. The next element in the time-series is a 9. Since 9 is greater than 3, the system inserts node 9 in the right sub-tree of node 3. Note that the system then updates the number of elements in the left and right sub-trees for each node in the AVL-tree after inserting a new node. In this case, node 3 has one element in the right sub-tree and zero elements in the left sub-tree. Node 9 has no elements in the left and right sub-trees.

Figure 2C:
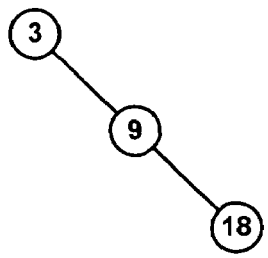
FIG. 2C illustrates inserting another element of the time-series into the AVL-tree in accordance with an embodiment of the present invention.

FIG. 2C illustrates inserting another element of the time-series into the AVL-tree in accordance with an embodiment of the present invention. The next element in the time-series is an 18. The system starts at node 3 and determines that 18 is greater than 3, therefore the system traverses the right sub-tree to node 9. Note that node 9 is a leaf-node (i.e. the node has no sub-nodes). At node 9, the system determines that 18 is greater than 9, therefore, the system inserts node 18 in the right sub-tree of node 9. Note that the system can only insert new nodes at leaf-nodes.

Recall that in an AVL-tree, the heights of the left and right sub-trees can only differ by at most one. In FIG. 2C, the height of the left sub-tree of node 3 is 0, while the height of the right sub-tree of node 3 is 2. Therefore, the difference between the right and left sub-trees of node 3 is 2. Note that the absolute value of this difference is greater than one. Hence, the AVL-tree must be reordered to maintain the balance of the sub-trees. In this case, a left rotation rebalances the AVL-tree.

Note that when calculating the difference between the heights of the left and right sub-trees at a given node, the longest path to a leaf-node of the sub-tree is used to calculate the height of the sub-tree. Also note that the balance factor at a given node is the difference between the height of the right sub-tree and the left sub-tree of the given node. If the balance factor is negative, at least one path to a leaf node in the left sub-tree is longer than all paths to leaf nodes in the right sub-tree. If the balance factor is positive, at least one path to a leaf node in the right sub-tree is longer than all paths to leaf nodes in the left sub-tree.

Figure 2D:
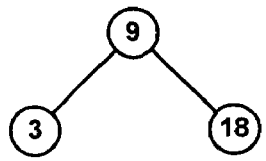
FIG. 2D illustrates a left rotation of the AVL-tree to balance sub-trees in accordance with an embodiment of the present invention.

FIG. 2D illustrates a left rotation of the AVL-tree to balance sub-trees in accordance with an embodiment of the present invention. Note that the left rotation causes node 9 to be the new root node, with node 3 in the left sub-tree and node 18 in the right sub-tree. Also note that after performing a rotation at a node, the system updates the number of elements in the left and right sub-trees for each node in the sub-tree at the node of rotation. In FIG. 2D, the update starts at node 9.

Figure 2E:
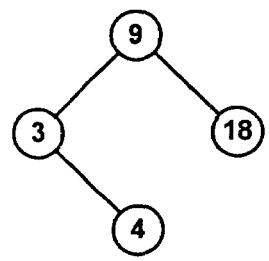
FIG. 2E illustrates inserting another element of the time-series into the AVL-tree in accordance with an embodiment of the present invention.
Figure 2F:
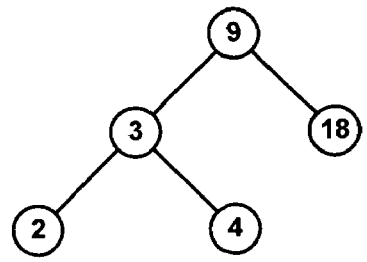
FIG. 2F illustrates inserting another element of the time-series into the AVL-tree in accordance with an embodiment of the present invention.

FIG. 2E illustrates inserting another element of the time-series into the AVL-tree in accordance with an embodiment of the present invention. The next element in the time-series is a 4. The system starts at node 9 and determines that 4 is less than 9, therefore the system traverses the left sub-tree to node 3. Note that node 3 is now a leaf-node. At node 3, the system determines that 4 is greater than 3, therefore, the system inserts node 18 in the right sub-tree of node 3. In this AVL-tree, all nodes are balanced, thus no rotations are necessary FIG. 2F illustrates inserting another element of the time-series into the AVL-tree in accordance with an embodiment of the present invention. The next element in the time-series is a 2. The system starts at node 9 and determines that 2 is less than 9, therefore the system traverses the left sub-tree to node 3. At node 3, the system determines that 2 is less than 3, therefore, the system inserts node 2 in the left sub-tree of node 3. Again, the AVL-tree is still balanced.

Figure 2G:
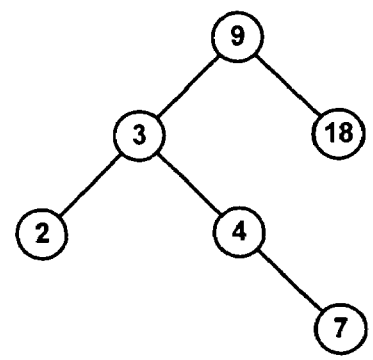
FIG. 2G illustrates inserting another element of the time-series into the AVL-tree in accordance with an embodiment of the present invention.

FIG. 2G illustrates inserting another element of the time-series into the AVL-tree in accordance with an embodiment of the present invention. The next element in the time-series is a 7. The system starts at node 9 and determines that 7 is less than 9, therefore the system traverses the left sub-tree to node 3. At node 3, the system determines that 7 is greater than 3, therefore, the system traverses the right sub-tree to node 4. At node 4, the system determines that 7 is greater than 4, therefore, the system inserts node 7 in the right sub-tree of node 4. In this case, node 9 is unbalanced (i.e. balance factor is −2). To correct this imbalance, two rotations are required. The system first performs a left rotation at node 3 (see FIG. 2H), followed by a right rotation at node 9 (see FIG. 2J).

Figure 2H:
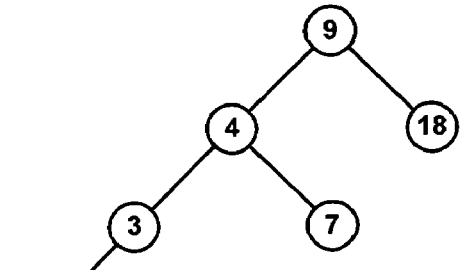
FIG. 2H illustrates another left rotation of the AVL-tree in accordance with an embodiment of the present invention.

FIG. 2H illustrates another left rotation of the AVL-tree in accordance with an embodiment of the present invention. The system performs a left rotation at node 3 so that node 4 becomes the new parent of the left sub-tree of node 9. As a result, the system places node 3 in the left sub-tree of node 4. Node, 2 remains in the left sub-tree of node 3.

Figure 2J:
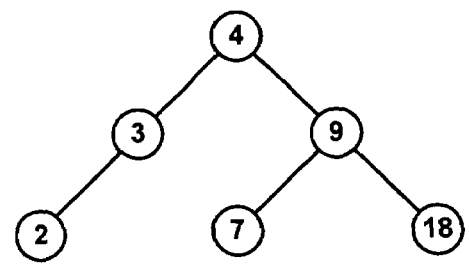
FIG. 2J illustrates a right rotation of the AVL-tree to balance sub-trees in accordance with an embodiment of the present invention.

FIG. 2J illustrates a right rotation of the AVL-tree to balance sub-trees in accordance with an embodiment of the present invention. The system performs a right rotation at node 9 so that node 4 is the new root of the AVL-tree. As a result node 3 remains the parent of the left sub-tree of node 4, and node 9 is the new parent of the right sub-tree of node 4. The new parent of the left sub-tree of node 9 is node 7 and the new parent of the right sub-tree of node 9 is node 18. Note that after these operations, the difference between the heights of the right and left sub-trees for each node in the AVL-tree differ by no more than one.

Figure 2K:
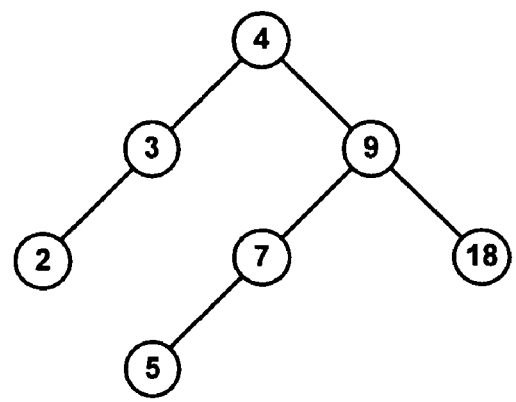
FIG. 2K illustrates inserting another element of the time-series into the AVL-tree in accordance with an embodiment of the present invention.

FIG. 2K illustrates inserting another element of the time-series into the AVL-tree in accordance with an embodiment of the present invention. The next element in the time-series is a 5. The system starts at node 4 and determines that 5 is greater than 4, therefore the system traverses the right sub-tree to node 9. At node 9, the system determines that 5 is less than 9, therefore, the system traverses the left sub-tree to node 7. At node 7, the system determines that 5 is less than 7, therefore, the system inserts node 5 in the left sub-tree of node 7.

Figure 2L:
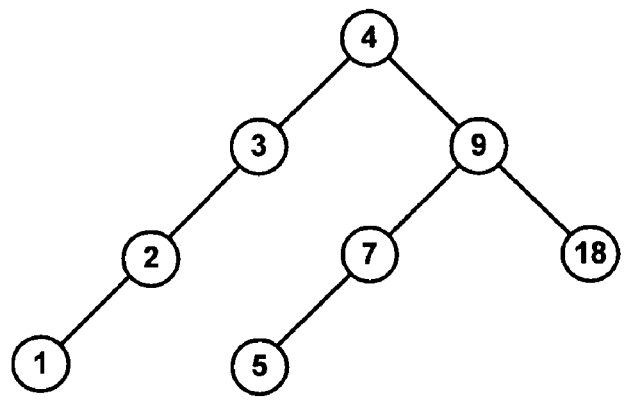
FIG. 2L illustrates inserting another element of the time-series into the AVL-tree in accordance with an embodiment of the present invention.

FIG. 2L illustrates inserting another element of the time-series into the AVL-tree in accordance with an embodiment of the present invention. The final element in the time-series is a 1. The system starts at node 4 and determines that 1 is less than 4, therefore the system traverses the left sub-tree to node 3. At node 3, the system determines that 1 is less than 3, therefore, the system traverses the left sub-tree to node 2. At node 2, the system determines that 1 is less than 2, therefore, the system inserts node 1 in the left sub-tree of node 2. Note that node 3 is unbalanced (i.e. balance factor is −2). Hence, to correct the imbalance, the system performs a right rotation at node 3.

Figure 2M:
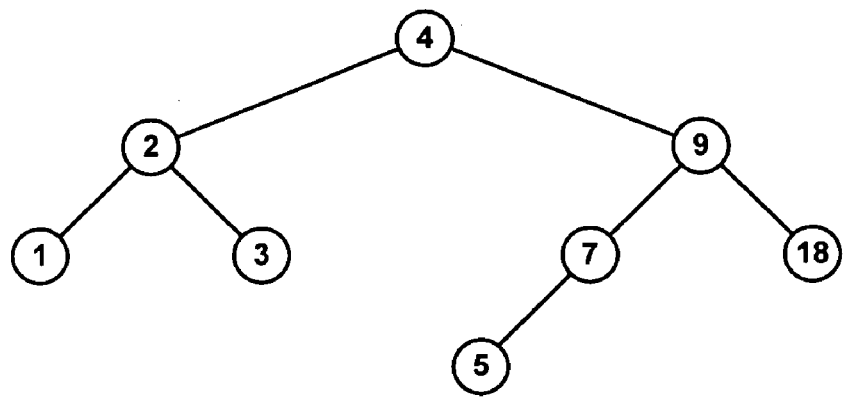
FIG. 2M illustrates another right rotation of the AVL-tree to balance sub-trees in accordance with an embodiment of the present invention.

FIG. 2M illustrates another right rotation of the AVL-tree to balance sub-trees in accordance with an embodiment of the present invention. The system performs a right rotation at node 3. As a result, node 2 becomes the new parent node for the left sub-tree of node 4. Node 1 is remains in the left sub-tree of node 2 and node 3 is now in the right sub-tree of node 2.

Combining AVL-trees with the MK Test

FIG. 3 presents pseudo-code for detecting a change-point in accordance with an embodiment of the present invention. The process begins when the system selects an element from the time-series array starting from the last element of the time-series. Next, the system removes all duplicate values for the selected element from the AVL-tree. The system then inserts the selected element into the AVL-tree. Note that when the element is inserted into the AVL-tree, the system updates the number of elements in each sub-tree for each node.

Next, the system traverses the AVL-tree to find node X. Along the way, the system computes the number of elements greater than X and the number of element less than X. For example, consider the state of the AVL-tree after inserting node 7 in FIG. 2J. In one embodiment of the present invention, the system starts at root node 4 and traverses the AVL-tree illustrated in FIG. 2J until in node 7 is reached. In this embodiment, the system uses the information stored at each node (i.e. the number of nodes in the left and right sub-trees) to keep a running total of the number of nodes in the AVL-tree which are greater than or less than the current node. One technique recognizes that while traversing to a right sub-tree, the node the system just left is less than the parent node in the right sub-tree. Hence, $n_L$ is incremented by one and $n_R$ is decremented by one. Furthermore, the number of elements in the left sub-tree of this parent node is added to the $n_L$ and the same amount is subtracted from $n_R$. Similarly, while traversing to a left sub-tree, the node the system just left is greater than the parent node in the right sub-tree. Hence, $n_R$ is incremented by one and $n_L$ is decremented by one. Furthermore, the number of elements in the right sub-tree of this parent node is added to the $n_R$ and the same amount is subtracted from $n_L$.

In FIG. 2J, node 4 has 2 nodes in the left sub-tree and 3 nodes in the right sub-tree, thus $n_L=2$ and $n_R=3$. Since 7 is greater than 4, the system traverses to the right sub-tree. Hence, $n_L$ is incremented by one and $n_R$ is decremented by one. Since node 9 has one node in the left sub-tree, the system adds one to $n_L$ and subtracts one from $n_R$. Thus, $n_L=4$ and $n_R=1$ at node 9. Next, the system determines that 7 is less than 9, thus the system traverses to the left sub-tree. Hence, $n_R$ is incremented by one and $n_L$ is decremented by one. Since node 7 has zero nodes in the right and left sub-trees, the system does not modify $n_L$ and $n_R$. Thus, $n_L=3$ and $n_R=2$ at node 7.

The system then computes the contribution to the trend statistic S for node X by adding the difference between $n_R$ and $n_L$ to S. For the example in FIG. 2J, the contribution to S for node 7 is 2−3=−1. The system then reinserts the duplicate elements. (Note that for the example array used in FIGS. 1A-1M, S=+8.)

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting a change-point in a time-series of telemetry signals from a computer system, comprising:
   receiving the time-series of telemetry signals from the computer system;
   for each element in the time-series,
      inserting the element into a data structure which keeps track of the number of elements in the data structure that have a value greater than and that have a value less than the value of the inserted element; and
      using the information stored in the data structure to add a contribution by the inserted element to a trend statistic for the time-series; and
   using the trend statistic to select a hypothesis for the trend in the time-series,
   wherein the telemetry signals can include hardware variables and software variables; and
   wherein the hardware variables include temperature, voltage, current, fan speeds, accelerometer signals, acoustic signals, relative humidity, and signals from other physical transducers.

2. The method of claim 1, wherein the software variables include load metrics, CPU utilization, idle time, memory utilization, disk activity, transaction latencies, and other performance metrics reported by the operating system.

3. The method of claim 1, further comprising:
   computing a confidence factor based on the trend statistic and the number of elements in the time-series;
   if the confidence factor is below a specified confidence level, rejecting the hypothesis; and
   otherwise, accepting the hypothesis.

4. The method of claim 1,
   wherein the data structure is a substantially-balanced binary search tree; and
   wherein inserting the element into the data structure involves:
      determining the value of the element;
      traversing the substantially-balanced binary search tree until a leaf-node is reached, wherein at each node of the substantially balanced binary search tree, the value of the element being inserted is compared to the value of the element stored at the node to determine which sub-tree of the node to follow;
      creating a new node at the leaf-node;
      inserting the element at the new node; and
      for each node,
         updating a variable at the node which indicates the number of elements in the substantially balanced binary search tree that have a value less than the value of the element stored at the node; and
         updating a variable at the node which indicates the number of elements in the substantially balanced binary search tree that have a value greater than the value of the element stored at the node.

5. The method of claim 4, wherein traversing the substantially-balanced binary search tree until a leaf-node is reached involves:
   if the value of the element being inserted is less than the value of the element stored at the node, selecting the sub-tree which corresponds to values less than the value stored at the node; and
   if the value of the element being inserted is greater than the value of the element stored at the node, selecting the sub-tree which corresponds to values greater than the value stored at the node.

6. The method of claim 4,
   wherein the substantially balanced binary search tree is an AVL-tree, and
   wherein for each node of the AVL-tree, the heights of the left sub-tree and the right sub-tree differ by at most one.

7. The method of claim 1, wherein using the information stored in the data structure to add the contribution by the inserted element to the trend statistic for the time-series involves:
   computing the contribution by the inserted element to the trend statistic by taking the difference between the number of elements in the data structure that have a value greater than the value of the inserted element and the number of elements in the data structure than have a value less than the value of the inserted element; and
   adding the contribution by the inserted element to the trend statistic for the time-series.

8. The method of claim 1, wherein using the trend statistic to select a hypothesis for the trend in the time-series involves:
   determining if the trend statistic for the time-series indicates that the trend in the time-series is increasing;
      if so, selecting an increasing-trend hypothesis;
      otherwise, determining if the trend statistic for the time-series indicates that the trend in the time-series is decreasing;
         if so, selecting a decreasing-trend hypothesis;
         otherwise, selecting the null hypothesis.

9. The method of claim 1, wherein prior to inserting elements into the data structure, the method further comprises removing duplicate values from the time-series.

10. The method of claim 9, wherein after using the information stored in the data structure to add the contribution by the inserted element to a trend statistic for the time-series, the method further comprises inserting duplicate values back into the data structure.

11. The method of claim 1, wherein elements in the time-series are inserted into the data structure in reverse-chronological order.

12. A computer-readable storage medium storing instructions that when executed by a computer cause the computer to perform a method for detecting a change-point in a time-series of telemetry signals from a computer system, comprising:
   receiving the time-series of telemetry signals from the computer system;
   for each element in the time-series,
      inserting the element into a data structure which keeps track of the number of elements in the data structure that have a value greater than and that have a value less than the value of the inserted element; and using the information stored in the data structure to add a contribution by the inserted element to a trend statistic for the time-series; and using the trend statistic to select a hypothesis for the trend in the time-series, wherein the telemetry signals can include hardware variables and software variables; and wherein the hardware variables include temperature, voltage, current, fan speeds, accelerometer signals, acoustic signals, relative humidity, and signals from other physical transducers.

13. The computer-readable storage medium of claim 12, wherein the software variables include load metrics, CPU utilization, idle time, memory utilization, disk activity, transaction latencies, and other performance metrics reported by the operating system.

14. The computer-readable storage medium of claim 12, the method further comprising:

computing a confidence factor based on the trend statistic and the number of elements in the time-series;

if the confidence factor is below a specified confidence level, rejecting the hypothesis; and otherwise, accepting the hypothesis.

15. The computer-readable storage medium of claim 12, wherein the data structure is a substantially-balanced binary search tree; and wherein inserting the element into the data structure involves:

determining the value of the element;

traversing the substantially-balanced binary search tree until a leaf-node is reached, wherein at each node of the substantially balanced binary search tree, the value of the element being inserted is compared to the value of the element stored at the node to determine which sub-tree of the node to follow;

creating a new node at the leaf-node;

inserting the element at the new node; and for each node, updating a variable at the node which indicates the number of elements in the substantially balanced binary search tree that have a value less than the value of the element stored at the node; and updating a variable at the node which indicates the number of elements in the substantially balanced binary search tree that have a value greater than the value of the element stored at the node.

16. The computer-readable storage medium of claim 15, wherein traversing the substantially-balanced binary search tree until a leaf-node is reached involves:

if the value of the element being inserted is less than the value of the element stored at the node, selecting the sub-tree which corresponds to values less than the value stored at the node; and if the value of the element being inserted is greater than the value of the element stored at the node, selecting the sub-tree which corresponds to values greater than the value stored at the node.

17. The computer-readable storage medium of claim 15, wherein the substantially balanced binary search tree is an AVL-tree, and wherein for each node of the AVL-tree, the heights of the left sub-tree and the right sub-tree differ by at most one.

18. The computer-readable storage medium of claim 12, wherein using the information stored in the data structure to add the contribution by the inserted element to the trend statistic for the time-series involves:

computing the contribution by the inserted element to the trend statistic by taking the difference between the number of elements in the data structure that have a value greater than the value of the inserted element and the number of elements in the data structure than have a value less than the value of the inserted element; and adding the contribution by the inserted element to the trend statistic for the time-series.

19. The computer-readable storage medium of claim 12, wherein using the trend statistic to select a hypothesis for the trend in the time-series involves:

determining if the trend statistic for the time-series indicates that the trend in the time-series is increasing;

if so, selecting an increasing-trend hypothesis;

otherwise, determining if the trend statistic for the time-series indicates that the trend in the time-series is decreasing;

if so, selecting a decreasing-trend hypothesis;

otherwise, selecting the null hypothesis.

20. The computer-readable storage medium of claim 12, wherein prior to inserting elements into the data structure, the method further comprises removing duplicate values from the time-series.

21. The computer-readable storage medium of claim 20, wherein after using the information stored in the data structure to add the contribution by the inserted element to a trend statistic for the time-series, the method further comprises inserting duplicate values back into the data structure.

22. The computer-readable storage medium of claim 12, wherein elements in the time-series are inserted into the data structure in reverse-chronological order.

23. An apparatus that detects a change-point in a time-series of telemetry signals from a computer system, comprising:

a receiving mechanism configured to receive the time-series of telemetry signals from the computer system; a change-point-detection mechanism configured to:

for each element in the time-series, to insert the element into a data structure which keeps track of the number of elements in the data structure that have a value greater than and that have a value less than the value of the inserted element; and to use the information stored in the data structure to add a contribution by the inserted element to a trend statistic for the time-series; and to use the trend statistic to select a hypothesis for the trend in the time-series, wherein the telemetry signals can include hardware variables and software variables; and wherein the hardware variables include temperature, voltage, current, fan speeds, accelerometer signals, acoustic signals, relative humidity, and signals from other physical transducers.

* * * * *